United States Patent
Hanumalagutti et al.

(10) Patent No.: US 10,069,379 B2
(45) Date of Patent: Sep. 4, 2018

(54) ELECTRIC MOTOR COOLING SYSTEM

(71) Applicant: FORD GLOBAL TECHNOLOGIES, LLC, Dearborn, MI (US)

(72) Inventors: Prasad Dev Hanumalagutti, Dearborn, MI (US); Michael W. Degner, Novi, MI (US); Becky Sue Morris, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 15/055,087

(22) Filed: Feb. 26, 2016

(65) Prior Publication Data

US 2017/0250591 A1  Aug. 31, 2017

(51) Int. Cl.
*H02K 9/19* (2006.01)
*H02K 5/20* (2006.01)

(52) U.S. Cl.
CPC ............ *H02K 9/19* (2013.01); *H02K 5/20* (2013.01)

(58) Field of Classification Search
CPC ............ H02K 9/00; H02K 9/005; H02K 9/10; H02K 9/12; H02K 9/19; H02K 5/20
See application file for complete search history.

(56) References Cited

U.S. PATENT DOCUMENTS

| | | | | |
|---|---|---|---|---|
| 2,303,883 | A * | 12/1942 | Kent | H02K 9/005 |
| | | | | 310/57 |
| 4,074,156 | A * | 2/1978 | Widstrand | H02K 9/06 |
| | | | | 165/47 |
| 5,652,469 | A | 7/1997 | Boardman et al. | |
| 5,939,805 | A * | 8/1999 | Vanduyn | H02K 9/00 |
| | | | | 310/417 |
| 6,300,693 | B1 | 10/2001 | Poag et al. | |
| 6,815,848 | B1 * | 11/2004 | Glew | H02K 5/20 |
| | | | | 310/402 |
| 8,659,190 | B2 | 2/2014 | Chamberlin et al. | |
| 8,970,074 | B2 | 3/2015 | Wagner et al. | |

* cited by examiner

*Primary Examiner* — Tran Nguyen
(74) *Attorney, Agent, or Firm* — David Kelley; Brooks Kushman P.C.

(57) ABSTRACT

An electric motor system includes a stator and a cover. The stator has windings that are affixed to an end periphery of the stator. The cover is secured to stator and defines a channel and a plenum. The channel extends along the end periphery and is configured to direct cooling fluid about the windings. The plenum extends over at least twenty percent of an outer perimeter of the cover and is configured to direct cooling fluid into the channel.

20 Claims, 3 Drawing Sheets

ELECTRIC MOTOR COOLING SYSTEM

TECHNICAL FIELD

The present disclosure relates to electric motors that may be used as a power source for a hybrid or electric vehicle.

BACKGROUND

Electric motors include stators that are made from an iron core and copper end windings. The copper end windings carry electric current and may generate heat during operation of the electric motor.

SUMMARY

An electric motor system includes a stator and a cover. The stator has windings that are affixed to an end periphery of the stator. The cover is secured to stator and defines a channel and a plenum. The channel extends along the end periphery and is configured to direct cooling fluid about the windings. The plenum extends over at least twenty percent of an outer perimeter of the cover and is configured to direct cooling fluid into the channel.

A cover for end windings that are affixed to an end periphery of an electric motor stator includes a housing that defines a channel and a plenum. The channel is configured to extend along the end periphery and direct cooling fluid about the end windings. The plenum is in fluid communication with the channel and is configured to direct cooling fluid into the channel through at least two openings.

A method of cooling end windings that are affixed to an end periphery of an electric motor stator includes directing cooling fluid into a plenum, and directing cooling fluid from the plenum through at least two openings into a channel that extends along the end periphery such that the cooling fluid is distributed to the end windings.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
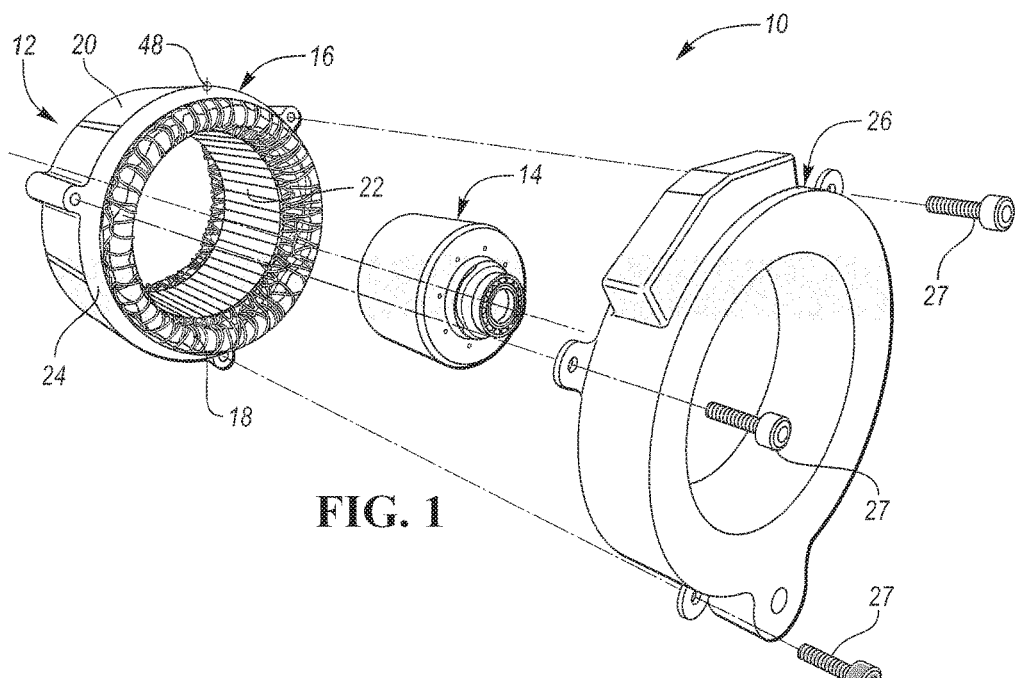
FIG. 1 is an exploded view of an electric motor system.

Referring to FIG. 1, an exploded view of an electric motor system 10 is illustrated. The electric motor system 10 may consist of an electric machine that operates as a motor, a generator, or a combination motor-generator. The electric motor system 10 includes a stator 12 and a rotor 14. The stator 12 includes an iron core 16, which may be made from magnetic steel laminations and end windings 18, which may be made from copper. The stator 12 includes an outer periphery 20, an inner periphery 22, and an end periphery 24. The inner periphery 22 defines an open center space. The copper end windings 18 may be affixed to or extend from the end periphery 24. The rotor 14 is disposed within the open center space of the stator 12. The rotor may be supported within the open center of the stator 12 by at least two bearings (not shown) disposed on each side of the rotor 14. The rotor 14 may be mechanically linked to a mechanical system, such as a hybrid or electric vehicle powertrain, in order to transfer power generated by the electric motor system 10 to the mechanical system. The rotor 14 may be linked to the mechanical system by a shaft, gearing arrangement, clutch, or any other mechanical linkage. The rotor 14 is configured to rotate when the stator 12 is energized by an electrical current.

The end windings 18 carry current and generate heat when the stator 12 is energized. It may be desirable to remove some of the heat generated by the end windings 18 when there is an excessive amount of heat being generated. Excess heat being generated by the end windings 18 may either cause damage to or reduce the performance of the electric motor system 10. A cooling fluid may be directed across the copper end windings 18 in order to remove the excess heat. A cover 26 may be secured to the stator 12. The front side of the cover 26 is depicted in FIG. 1. The cover 26 may include various openings, passageways, or channels that are configured to deliver cooling fluid to the end windings 18. The cover 26 may be secured to the stator 12 by at least one fastener 27 that engages through holes and tapped holes in the cover 26 and stator 12, respectively. The cover 26 may be configured to cover the end windings 18.

Figure 2:
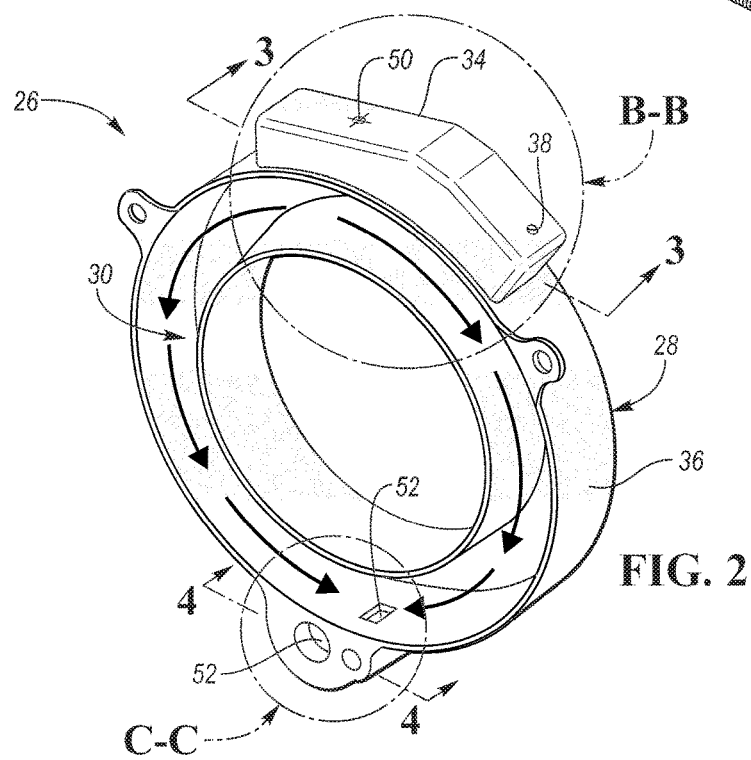
FIG. 2 is a back side of a stator end winding cover.
Figure 3:
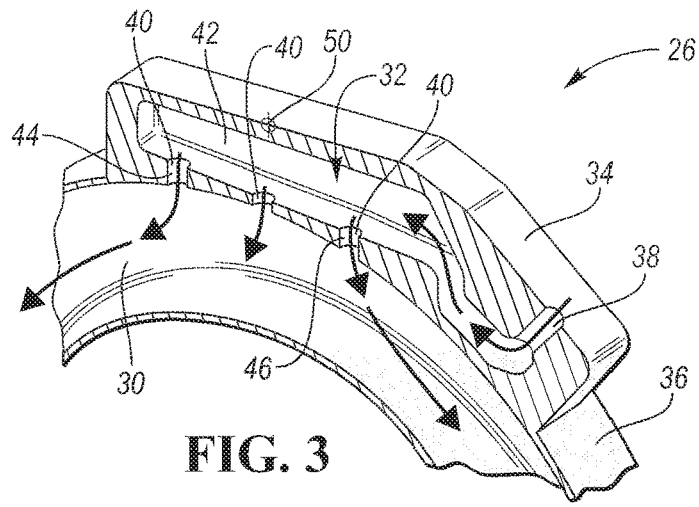
FIG. 3 is an enlarged cross-sectional view taken along line 3-3 and bounded by the area B-B in FIG. 2.
Figure 4:
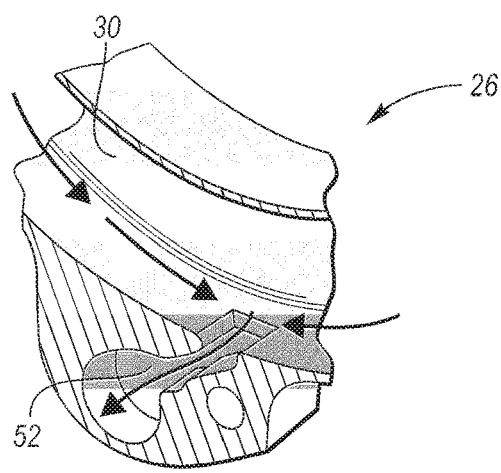
FIG. 4 is an enlarged cross-sectional view taken along line 4-4 and bounded by the area C-C in FIG. 2.

Referring to FIGS. 2-4, the back side of the cover 26 (which may also be referred to as a stator end winding cover) is illustrated. The cover includes a cover housing 28. The cover housing 28 may define a channel 30. The channel 30 is configured to extend along the end periphery 24 and around the end windings 18 when the cover 26 is secured to the stator 12. The channel 30 may also be configured to direct cooling fluid about the end windings 18 when the cover 26 is secured to the stator 12. The cover housing 28 may also define a plenum 32 that is in fluid communication with and is configured to direct cooling fluid into the channel 30. The plenum 32 may be defined within a plenum housing 34 that is either affixed to the cover housing 28 or is an integral part of the cover housing 28. The plenum 32 and plenum housing 34 may extend over at least twenty percent of an outer perimeter 36 of the cover 26 (or the cover housing 28).

The plenum 32 may include an inlet opening or inlet 38, a plurality of openings or outlets 40, and a pressure equalization chamber 42. In the depicted embodiment, three outlets 40 are shown, however it should be understood that two or more outlets 40 may be included. The inlet 38 is in fluid communication with a cooling fluid supply source and the pressure equalization chamber 42. The plurality of outlets 40 are in fluid communication with the pressure equalization chamber 42 and the channel 30. The cooling fluid supply source is configured to supply cooling fluid to the pressure equalization chamber 42 via the inlet 38. The pressure equalization chamber 42 is configured to supply cooling fluid to the channel 30 via the plurality of outlets 40. The plurality of outlets 40 may include at least one right outlet 44 and at least one left outlet 46 that are offset to right and left sides, respectively, of a top center location 48 of the end periphery 24 (see FIG. 1) of the stator 12 when the cover 26 is secured to the stator 12. The least one right outlet 44 and at least one left outlet 46 may also be offset to right and left sides, respectively, of a top center location 50 of the cover housing 28.

The cover housing 28 may also include a channel outlet 52 that is in fluid communication with the channel 30. The channel outlet 52 is configured to direct cooling fluid out of the channel 30 at a bottom of the channel 30, after the cooling fluid has removed the excess heat from the end windings 18.

Figure 5:
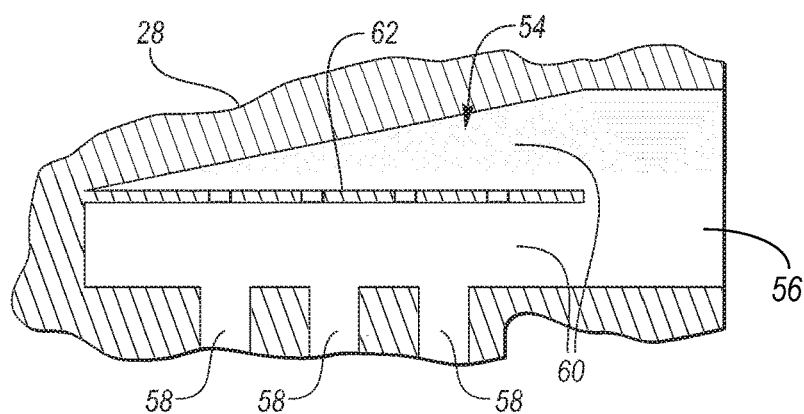
FIG. 5 is an alternative configuration for a plenum that is defined on an inlet side of the stator end winding cover.

Referring to FIG. 5, an alternative configuration for a plenum 54 that is defined by the cover housing 28 is illustrated. The plenum 54 will function in the same manner as described above with respect to plenum 32, unless otherwise stated. The plenum 54 may include an inlet opening or inlet 56, a plurality of openings or outlets 58, and a pressure equalization chamber 60. The inlet opening or inlet 56, plurality of openings or outlets 58, and pressure equalization chamber 60 will function in the same manner as the inlet opening or inlet 38, plurality of openings or outlets 40, and pressure equalization chamber 42, respectively, unless otherwise stated. The inlet 56 is in fluid communication with a cooling fluid supply source and the pressure equalization chamber 60. The plurality of outlets 58 are in fluid communication with the pressure equalization chamber 60 and the channel 30. The cooling fluid supply source is configured to supply cooling fluid to the pressure equalization chamber 60 via the inlet 56. The pressure equalization chamber 60 is configured to supply cooling fluid to the channel 30 via the plurality of outlets 58.

The pressure equalization chamber 60 may taper in a direction extending away from the inlet 56. Tapering the pressure equalization chamber 60 in the direction of flow of the cooling fluid may prevent the formation of a recirculating zone within the pressure equalization chamber 60. The formation of a recirculating zone within the pressure equalization chamber 60 is undesirable because the cooling fluid will flow in a circular pattern within the pressure equalization chamber 60 as opposed to flowing from the inlet 56 to the plurality of outlets 58. A plate 62 having perforations may also be disposed within pressure equalization chamber 60. A perforated plate may function to assist in equalizing the cooling fluid pressure within the pressure equalization chamber 60.

Figure 6:
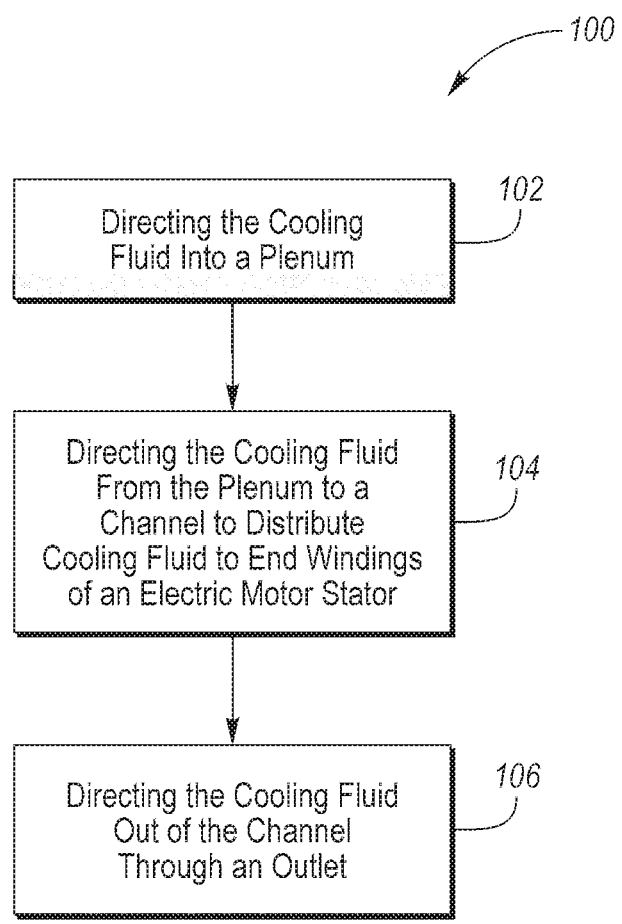
FIG. 6 is a method of cooling stator end windings of an electric motor.

Referring to FIG. 6, a method 100 of cooling the stator end windings 18 of the electric motor system 10 is illustrated. The method 100 begins at block 102 by directing cooling fluid into the plenum 32 of the cover 26 while the cover is affixed to the stator 12. Next, at block 104, the cooling fluid is directed from the plenum 32 into the channel 30 through the plurality of openings or outlets 40 to distribute the cooling fluid to the end windings 18. The cooling fluid then flows through the channel 30 and about the end windings 18 of the stator 12 to remove any excess heat from the end windings 18. The cooling fluid is then directed out of the channel 30 through the channel outlet 52 at block 106.

The electric motor system 10 may be an electric motor, electric generator, or electric motor generator combination that is used in an electric vehicle or hybrid vehicle to propel the vehicle, recuperate kinetic energy (e.g., via regenerative braking), or provide a reaction force (e.g., an electric motor that is mechanically coupled to a first element of planetary gearing arrangement while an internal combustion engine is coupled to a second element of the planetary gearing arrangement). The electric motor system 10 could be used in any type of electric or hybrid vehicle, including but not limited to, battery electric vehicles (BEVs), plug-in hybrid vehicles (PHEVs), series hybrid vehicles, parallel hybrid vehicles, series-parallel hybrid vehicles, and power-split hybrid vehicles.

If the electric motor system is being used in a vehicle, the cooling fluid that is used to cool the end windings 18 of the stator 12 may be transmission oil that is pumped into the inlet 38 of the plenum 32. The supply source of the transmission oil may comprise transmission oil that has collected within a sump of a vehicle transmission. A transmission pump may be employed to direct the transmission fluid from the sump to the inlet 38 of the plenum 32. Transmission fluid may exit the cooling channel 30 of the cover housing 28 through the channel outlet 52. The transmission fluid that exits the cooling channel 30 may be directed back into the sump. The transmission fluid may be directed into the sump by the force of gravity or by an additional pump.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An electric motor system comprising:
   a stator having windings affixed to an end periphery of the stator; and
   a cover secured to stator and defining,
      a channel extending along the end periphery and configured to direct cooling fluid about the windings, and
      a plenum extending over at least twenty percent of an outer perimeter of the cover and configured to direct cooling fluid into the channel.

2. The system of claim 1, wherein the plenum includes an inlet, a pressure equalization chamber, and a plurality of outlets, and wherein the inlet is in fluid communication with the pressure equalization chamber and the plurality of outlets are in fluid communication the pressure equalization chamber and the channel.

3. The system of claim 2, wherein the plurality of outlets includes right and left outlets that are offset to right and left sides of a top center location of the end periphery, respectively.

4. The system of claim 3, wherein the plurality of outlets includes three outlets.

5. The system of claim 2, wherein the pressure equalization chamber tapers in a direction extending away from the inlet.

6. The system of claim 2, further comprising a plate having perforations disposed within the pressure equalization chamber.

7. The system of claim 1, wherein the cover defines an outlet that is in fluid communication with and is configured to direct cooling fluid out of the channel.

8. The system of claim 7, wherein the outlet is configured to direct cooling fluid out of the channel at a bottom of the channel.

9. A cover for end windings that are affixed to an end periphery of an electric motor stator comprising:
   a housing defining,
      a channel that is configured to extending along the end periphery and direct cooling fluid about the end windings, and
      a plenum in fluid communication with the channel and configured to direct cooling fluid into the channel through at least two openings.

10. The cover of claim 9, wherein the plenum includes a pressure equalization chamber that is in fluid communication with the at least two openings and an inlet opening that fluid communicates the pressure equalization chamber with a cooling fluid supply source.

11. The cover of claim 10, wherein the at least two openings includes right and left openings that are offset to right and left sides of a top center location of the end periphery, respectively.

12. The cover of claim 11, wherein the at least two openings includes three openings.

13. The cover of claim 10, wherein the pressure equalization chamber tapers in a direction extending away from the inlet opening.

14. The cover of claim 10, further comprising a plate having perforations disposed within the pressure equalization chamber.

15. The cover of claim 9, wherein the housing defines an outlet that is in fluid communication with and is configured to direct cooling fluid out of the channel.

16. The cover of claim 15, wherein the outlet is configured to direct cooling fluid out of the channel at a bottom of the channel.

17. A method of cooling end windings that are affixed to an end periphery of an electric motor stator comprising:
   directing cooling fluid into a plenum; and
   directing cooling fluid from the plenum through at least two openings and into a channel that extends along the end periphery such that the cooling fluid is distributed to the end windings.

18. The method of claim 17, wherein the plenum includes a pressure equalization chamber that is in fluid communication with the at least two openings and the cooling fluid is directed from the pressure equalization chamber through the at least two openings and into the channel.

19. The method of claim 18, wherein the at least two openings includes right and left openings that are offset to right and left sides of a top center location of the end periphery, respectively.

20. The method of claim 18, wherein the pressure equalization chamber tapers in a direction extending away from an inlet opening into the pressure equalization chamber.

* * * * *